United States Patent [19]

Kluth et al.

[11] Patent Number: 4,558,073
[45] Date of Patent: Dec. 10, 1985

[54] COMPOSITION FOR THE PRODUCTION OF POLYURETHANE FOAM MATERIALS HAVING IMPROVED FORM STABILITY

[75] Inventors: Hermann Kluth; Jürgen Wegner, both of Düsseldorf, Fed. Rep. of Germany

[73] Assignee: Henkel Kommanditgesellschaft auf Aktien, Düesseldorf, Fed. Rep. of Germany

[21] Appl. No.: 633,683

[22] Filed: Jul. 25, 1984

Related U.S. Application Data

[63] Continuation of Ser. No. 385,101, May 4, 1982, abandoned.

[30] Foreign Application Priority Data

Jun. 9, 1981 [DE] Fed. Rep. of Germany ....... 3122790

[51] Int. Cl.⁴ .................. C08G 18/14; C08J 9/00; C09K 3/30
[52] U.S. Cl. ........................... 521/110; 521/112
[58] Field of Search ................. 521/110, 112

[56] References Cited

U.S. PATENT DOCUMENTS

4,347,330  8/1982  Demou et al. .............. 521/110

FOREIGN PATENT DOCUMENTS

0955095  12/1956  Fed. Rep. of Germany .
1128133  8/1959  Fed. Rep. of Germany .
0769091  7/1953  United Kingdom .
2053943  2/1981  United Kingdom .

*Primary Examiner*—John Kight
*Assistant Examiner*—M. L. Moore
*Attorney, Agent, or Firm*—Ernest G. Szoke; Nelson Littell, Jr.; Henry E. Millson, Jr.

[57] ABSTRACT

The present invention relates to one component polyurethane foam compositions which comprise mixtures of prepolymers of a polyol and an excess of isocyanate; the usual adjuvants for polyurethane foams, an expanding gas under pressure and a polysiloxane compound with antifoam activity stored in a valved pressure vessel.

14 Claims, No Drawings

COMPOSITION FOR THE PRODUCTION OF POLYURETHANE FOAM MATERIALS HAVING IMPROVED FORM STABILITY

This application is a continuation of application Ser. No. 385,101, filed June 4, 1982, and now abandoned.

BACKGROUND OF THE INVENTION

As a recent development in the field of synthetic foam materials, it is known that polyurethane foam materials can be produced from suitable compositions by reacting mixtures of polyols, foam stabilizers, plasticizers and optionally additional adjuvants, such as accelerators, with an excess of organic di-isocyanates and/or higher poly-isocyanates under pressure in the presence of liquefied expanding gases to obtain prepolymers containing free isocyanate groups. This reaction is expediently carried out in a pressure vessel, e.g. in aerosol cans. Upon discharge and expansion of the composition via a pressure valve, while the expanding agent evaporates a so-called froth foam is formed, which polymerizes by action of ambient moisture on the still free isocyanate groups. These can be used in many ways, such as building materials.

Pertinent patent literature is German patent application Nos. 20 45 852, 27 58 114 and 30 22 578 as well as U.S. Pat. No. 3,830,760.

The compositions when maintained in systems under pressure have a reasonably long storage life. These are sometimes called a one component system since nothing is added to them before releasing the pressure. This is in contrast to two component systems where the organic polyol, catalyst foaming agent and additives are kept separate from the isocyanates until immediately prior to the formation of foam.

A certain disadvantage of the polyurethane foam materials thus produced is their tendency to undergo an additional volume expansion even after polymerization, rather slowly at room temperature, but relatively quickly at elevated temperature or elevated humidity of the air. Such volume expansion may lead to deformation of foam-filled objects as for example door posts or window frames.

To eliminate this disadvantage, the attempt has already been made to reduce the undesirable tendency to subsequent volume expansion to an acceptable degree by using as, a secondary expanding agent, a rather high proportion of diphenyl methane diisocyanate or by addition of trichlorofluoromethane as well as by the use of special nitrogen-containing polyols in combination with a more volatile primary expanding agent such as monochlorodifluoromethane or dichlorodifluoromethane.

However, it is still found that polyurethane foam materials of the kind here described, produced by the known methods, show, in particular, at slightly to moderately elevated temperatures of for instance 40° to 70° C., a subsequent volume expansion of about 10 to 15% both when stored dry and at a relative humidity of 90%.

OBJECTS OF THE INVENTION

It is an object of the present invention to provide improved compositions for the production of polyurethane foams.

Another object of the present invention to provide compositions for the production of polyurethane foams particularly suited for use in a one component system.

It is another object of the present invention to provide an aerosol package for the production of polyurethane foams utilizing the compositions of the invention.

A further object of the present invention to provide polyurethane foams having improved stability with respect to post foam formation expansion.

These and other objects of the invention will become more apparent from the following detailed description thereof.

DESCRIPTION OF THE INVENTION

It was noted, surprisingly, that by the addition of very small amounts of known surface-active polysiloxane compounds which have antifoam activity for aqueous and/or organic systems in the known compositions of the kind described, a stabilization of the foam material volume can be achieved.

Accordingly, the invention relates to polyurethane foam forming one component systems contained in a pressure vessel which are mixtures of (a) prepolymers containing isocyanate groups from the reaction of OH group containing polyesters and/or polyethers (polyols) with polyisocyanates, (b) the usual adjuvants for polyurethane foams as well as (c) expanding agents and which are characterized in that they contain in addition 0.015 to 0.1 percent by weight based on the weight of polyols plus adjuvants of a surface active polysiloxane compound which has antifoam activity.

The invention also relates to the use of the stated quantities of surface-active polysiloxane compounds which have antifoam activity in one component polyurethane foam systems of the stated kind to increase the form stability of the polyurethane foam produced by pressure release.

Lastly, the invention relates to the process for the production of form stable polyurethane foam materials by use of a one-component system, which is characterized in that there is added to the usual prepolymers on the basis of hydroxyl group-containing polyesters and/or polyethers, which have been reacted with an excess of organic polyisocyanates and are present in mixture with the usual adjuvants, 0.015 to 0.1 percent by weight (based on) the combined weight of polyol and adjuvants of a surface-active polysiloxane compound which has antifoam activity.

Under the designation "polysiloxane compounds with antifoam action", numerous commercial products are on the market. The most important ones belong to either of two groups, namely dimethyl polysiloxanes and, respectively, polysiloxanes which contain perfluorinated alkyl groups, in particular trifluromethyl groups. The dimethyl polysiloxanes are of special importance in the practice of the invention.

Preferably the polysiloxane antifoaming agents used according to the invention have a dynamic viscosity at 25° C. of between 20 and 300,000 $mm^2.s^{-1}$. Within this range, dynamic viscosities of about 100 to 10,000 $mm^2.s^{-1}$ may be especially significant. This is true in particular of the polysiloxanes containing perfluorinated alkyl groups.

The dimethyl polysiloxanes to be employed according to the invention are so-called methyl silicone oils, as available on the market and characterized by the following general formula:

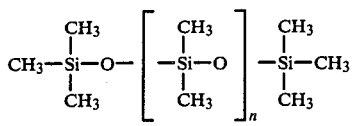

In this general formula, n is an integer which can assume values of a wide numerical range depending on the molecule size. Suitably, however, the methyl silicone oils to be used according to the invention are characterized by their previously defined dynamic viscosity.

Similar to the methyl silicone oils is the behavior, in the proposed invention, of the polysiloxanes which contain perfluorinated alkyl groups, also available on the market as antifoaming agents, but which, like the methyl silicone oils, can also be employed for a variety of purposes, for instance as moisture repelling agents, releasing and lubricating agents, as adjuvants in the manufacture of varnish or lacquer, as polishing agents and the like besides being used as antifoaming agents for aqueous and/or organic systems.

According to the invention it has been found to be especially favorable to add about 0.02 to 0.05 percent by weight of a dimethyl polysiloxane or of a polysiloxane containing perfluorinated alkyl groups, of the stated dynamic viscosity range, to one component mixtures, the weight percentage being again based on the weight of polyol components plus adjuvants.

With respect to the usual adjuvants for polyurethane foam compositions, according to the invention, the copolymers of alkyl silicone and polyoxyalkylene are of special importance. A summary description of the production of polyurethane foam materials with the addition of such foam stabilizers can be found for example in Saunders and Frisch "Polyurethanes, Chemistry and Technology", volume XVI of the series "High Polymers", Interscience Publishers, New York, London, Part 1 (1962) and in particular Part 2 (1964), pages 67 to 69. Reference is made further to "Plaste und Kautschuk" (Plastics and Rubber) Volume 28 (1981), pages 73 to 76, as well as German patents DE-PS No. 12 33 133 and DE-OS No. 22 08 149. Precisely in connection with the prior art concerning one component systems of the present type, which are under pressure of a partially liquefied expanding agent, the addition of these foam stabilizers is intended, cf. the literature cited at the beginning. Thus, for example, on page 10 of DE-OS No. 27 58 114 the addition of siloxane/oxyalkylene copolymers as foam stabilizers in the production of polyurethane foam compositions by the method here concerned is described. It is found, however, that foam stabilizing polysilicone compounds of the kind heretofore used in one component systems have no influence on the subsequent volume increase of the hardened foam material. Besides, these foam stabilizer types such as siloxane/oxyalkylene copolymers are used in much larger quantities than the antifoaming agent type such as dimethyl silicone oils or corresponding perfluorinated polysilicone compounds when the latter are also used in the proposed invention.

Yet in connection with an especially preferred embodiment the addition of foam stabilizers, based on siloxanes, in particular the co-use of siloxane/oxyalkylene copolymers is of special importance for the invention. Suitable, for example, are siloxane/oxyalkylene copolymers which contain about 5 to 25% siloxane units and 95 to 75% oxyalkylene groups. An especially suitable oxyalkylene group may be the oxypropylene group. These foam stabilizers are preferably used in quantities of about 1 to 5 percent by weight based on the weight of the polyols and adjuvants used. In this especially important embodiment, therefore, two different types of siliconorganic polymer compounds are used together, the known foam stabilizers siloxane/oxyalkylene copolymers in a comparatively large quantity and the dimethyl silicone oils or their perfluorinated derivatives which have antifoaming activity in comparatively very much smaller quantities.

Other customary adjuvants for polyurethane foam composition production are plasticizers, in particular flame-retarding plasticizers, which can be used for example in quantities of 25 to 35 percent by weight, referred to polyols plus adjuvants. Customary plasticizing agents which increase the flame resistance of polyurethane foam materials are compounds containing phosphorus and/or halogen atoms, such as tricresyl phosphate tris-2-chloroethyl phosphate, tris-$\beta$-chloropropyl phosphate and tris-2-,3-dibromo-propyl phosphate. In addition, there may be used as flame protective agents for example: chloroparaffins, halogen phosphites, ammonium phosphate, and halogen- and phosphorus-containing resins.

As further adjuvants for polyurethane production the known catalysts or catalyst systems can be used, as described for example in the cited literature reference, Saunders and Frisch "Polyurethanes, Chemistry and Technology" Part 2 (1964), p. 45 ff. Especially suitable are tertiary amines of the type of aliphatic tertiary amines, N-substituted morpholines or N,N'-substituted piperazines. However, it is a preferred embodiment of the invention to dispense with the addition of such catalysts and instead of this to ensure the desired reactivity of the polyurethane forming components by suitable selection of polyisocyanates and/or polyols.

Thus it may be expedient to use as polyol components, at least in part, polyester and/or polyether polyols which contain tertiary amino groups, as known for the production of so-called froth foams. It may be expedient to proceed from a polyol mixture which consists of oxypropylated amines and/or polypropylene glycols and which has been polymerized in the usual manner, the molecular weights of these components to be between 500 and 10,000, more particularly between 800 and 2000. Also it is possible to use OH group-containing polyesters which have been produced by esterification of multi-functional alcohols such as glycerol, ethylene glycol, diethylene glycol with polycarboxylic acids such as glutaric acid, sebacic acid, isophthalic acid or the like. Suitable as polyols are, for example, generally di to octafunctional polyesters and/or polyether polyols, mixtures of polyols containing nitrogen groups and polyols free from nitrogen groups being preferred. Suitable nitrogen group-containing polyester polyols can be produced for example from polycarboxylic acids, preferably dicarboxylic acids and di- and/or trialkanolamines, e.g. di- and/or tri-isopropanolamine, possibly in mixture with polyhydric alcohols or from mixtures of diamines such as ethylene diamine and polyhydric alcohols. Suitable polycarboxylic acids are for example, glutaric acid, succinic acid, adipic acid, sebacic acid, phthalic acid, isophthalic acid or terephthalic acid. Suitable multi-functional alcohols are, for example, ethylene glycol, propanediol, in particular 1,2-propanediol or 1,3-propanediol, or also diols of higher carbon number, as butanediol or hexanediol, diethylene glycol, dipropylene glycol, but also higher functional alcohols such as glycerol, trimethylol propane or pentaerythritol. Corresponding polyether polyols can be produced in a known manner from alkylene oxides of limited carbon number, e.g. with 2 to 5 carbon atoms in the alkylene radical. Where it is preferred to work with polyether polyols containing nitrogen groups, a starter molecule containing amino groups which contains at least two active hydrogen atoms can be used. The alkylene oxides are for example: Ethylene oxide, 1,2-propylene oxide or 1,3-propylene oxide, 1,2-butylene oxide or 2,3-butylene oxide or styrene oxide. To introduce the nitrogen-containing groups there may be used as starter molecules, for example, ammonia, hydrazine or alkyl hydrazines, possibly substituted guanidines, diamines, amino alcohols and comparable compounds, which may also be partially substituted with nitrogen. Analogously the information given here concerning the production of polyester or polyether polyols applies as well to the production of corresponding polyester or polyether polyols free of nitrogen groups, which can be used as such or in mixture with the nitrogen group containing compounds.

As polyisocyanate components, aromatic polyisocyanates or isocyanate mixtures are especially preferred. As examples of such aromatic polyisocyanates may be named: Toluylene diisocyanates, in particular also the commercial crude mixtures of the position isomers 2,4-toluylene diisocyanate and 3,6-toluylene diisocyanate, and diphenyl methane diisocyanate or respectively its commercial crude mixtures which still contain oligomeric polyphenyl polymethylene polyisocyanates and which are liquid.

The polyols or polyol mixtures are caused to react with the polyisocyanates in such quantity ratios that the prepolymers containing isocyanate groups have preferably a content of free isocyanate groups in the range of about 5 to 25 percent by weight, more particularly in the range of about 10 to 20 percent by weight-based on the weight of the prepolymer. The reaction between polyol and isocyanate is normally effected in the temperature range up to about 100°, preferably at normal temperature to only moderately elevated temperatures.

The expanding agents to be considered are low boiling components which preferably liquefy under the applied pressures in the reaction vessel and which evaporate quickly at pressure relief. The expanding agents must be inert to the other components of the reaction mixture. Suitable are, for example, chloro-fluoro hydrocarbons with boiling points below about 30° C. under normal conditions. Suitable are, for example, monochlorodifluoromethane, dichloromonofluoromethane, dichlorodifluoromethane and trichlorofluoromethane. Other suitable agents are volatile hydrocarbons, e.g. propane, isobutane, and dimethyl ether or mixtures of the halogenated hydrocarbons and readily volatile non-halogenated hydrocarbons.

If one divides the constituents of the one-component mixture into the groups
A: polyols+adjuvants
B: polyisocyanates
C: expanding agents
a general rule for the substance composition is that each of these constituents A, B and C can represent, by weight, about ⅓ of the total mixture.
More generally the following applies:

The expanding agent C is normally in the range of 20 to 45 percent by weight of the total mixrture of A, B and C. The weight ratio A:B is normally in the range of from 0.7:1 to 1:1 parts by weight—taking into account mean values of about 30 weight percent plasticizer and/or flame preventative and about 3 weight percent foam stabilizer of siloxane/oxyalkylene copolymers based in each instance on the weight of component A. The addition in accordance with the invention of 0.015 to 0.1 weight percent of dimethyl silicone oils or corresponding perfluorinated polysiloxanes is based mathematically on component A.

The reactive one component systems of the invention are produced expediently by mixing the hydroxyl-group containing starting materials with the plasticizers and with the liquefied or liquid isocyanate in a dry pressure apparatus. Simultaneously or subsequently the expanding agent may be added. But it is possible also to meter the components into aerosol cans directly together with the expanding agent.

Besides the adjuvants named before other known additives can be used. For example, dyes and hydrolysis protectants may be named.

The foamable one-component mixtures of the invention are storage stable. They can be used for example for joining and filling internal spaces in items such as doors, door posts or cavities in structures or in automobiles. They have the special feature of extremely little subsequent volume expansion. In general, value of about 2% are not exceeded. In the preferred compositions of the invention the subsequent volume expansion is below about 1% and in particular in the range of at most about 0.5%. This subsequent volume expansion is determined according to the "Guidelines for the testing of one-component polyurethane foam material" (A-K-PUR foam) of the South German Plastics Center of June 1980 (SB.7.1/680) cf. in particular 5.7.2 and 5.7.3 of the guidelines. The high form stability of the polyurethane foams produced according to the invention manifests itself even under more rigorous aging conditions, for example in aging at temperatures of about 70° C. The materials of the invention are thus clearly superior to all hitherto known one component polyurethane foam materials.

The addition of dimethyl polysiloxanes has been mentioned occasionally in particular in the older literature in the production of polyurethane foam compositions. Thus GB Pat. No. 1,077,888 proposes the addition of very small quantities of an aqueous emulsion of dimethyl polysiloxanes in the production of polyurethane foam material, to create a pore structure similar to that of a sponge. Instead of a uniform pore structure, pores or cells of different sizes are to be created. Cell regulation and in particular control of the cell size by addition of dimethyl polysiloxane, in particular in polyether foam compositions, is mentioned by way of example also in "Kunststoff Handbuch" Volume VII, Polyurethanes, 1966 Carl Hanser-Verlag, Munich, cf. for example on page 105 last paragraph, and pages 448/449. Here with polyether isocyanates as starting material for the formation of polyurethane foam material, polydimethyl siloxane compounds are to be used, with the remark that if too little silicone oil is used, only few but large gas bubbles are formed which escape from the mixture, while upon addition of too much silicone oil many very small cells form, and although at first the full foam height is reached, then the foam collapses. The special formulations given on page 449 loc. cit. contain by comparison with the teaching of the invention substantially larger quantities of polydimethyl siloxane.

All these proposals of the prior art do not concern the one component mixtures of the present invention with their special technical problems of the polyurethane foams obtained therefrom by expansion and evaporation of the expanding agent. In particular, nowhere does the prior art describe the joint use, essential in the preferred embodiment of the invention, of a comparatively large quantity of a foam stabilizer on the basis of siloxane/oxyalkylene copolymers and of a comparatively very small quantity of antifoaming agents of the kind of the dimethyl polysiloxanes.

The following example of the invention is given by way of illustration and not by way of limitation.

EXAMPLE

Through a mixing head, the premixed components I+II necessary for prepolymer formation were metered directly into dry aerosol cans.

| Component I: | |
|---|---|
| Oxypropylated triethanolamine (mol. wt. 1000) | 543 g |
| Polypropylene glycol (mol. wt. 1000) | 134 g |
| Diphenyl-cresyl phosphate | 284 g |
| Siloxane/oxyalkylene copolymer (80% oxyalkylene; 20% siloxane units) | 39 g |
| Component II: | |
| Technical liquid diphenyl methane diisocyanate | 1250 g |

Thereafter the required quantity of liquefied expanding agent (dichlorodifluromethane) was filled into aerosol cans. This can be done directly through the valve of the aerosol can to thereby avoid contact with possibly moist ambient air. The additives of the invention, dimethyl polysiloxane or respectively commercial fluorosilicone oils (polyalkyl siloxane containing perfluorinated side chains), were added to component I before mixing.

The foamed foam products were tested according to the "Guidelines for the testing of one Component polyurethane foam material" (A-K-PUR foam) of the South German Plastics Center of June 1980 (SB.7.1/680) and it was found that they fulfilled the usual requirement. The values for form stability are given below. They were especially good. In the following table, the amount of the dimethyl polysiloxane or fluorosilicone oil used, which are defined by their viscosity are based on Component I. The values given for Δh and the percentage change as a measure of the form stability are after storage for one week at +40° C. in a circulating air oven (cf. 5.7.2 and 5.7.3 of the Guidelines).

TABLE

| VISCOSITY | | Dimensional change in set foam width | |
|---|---|---|---|
| Wt. % | mm² · s⁻¹ | Δh | % |
| Dimethyl polysiloxane (Wt. % referred to polyol) | | | |
| 0.025 | 100 | 0.44 | 2.20 |
| 0.05 | 100 | <0.1 | <0.5 |
| 0.05 | 10,000 | 0.1 | 0.5 |
| 0.05 | 300,000 | 0.12 | 0.6 |
| Fluorosilicone oil | | | |
| 0.05 | 1300 | 0.28 | 1.4 |
| 0.05 | 1,000 | 0.3 | 1.5 |

Comparison test without addition according to invention (a) 1.88 Δh 9.4% dimensional change in set foam width
(b) 2.0 Δh 10.0% in dimensional change in set foam width.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. Polyurethane foam forming compositions suitable as one component systems contained in a pressure vessel, forming foams having improved stability with respect to post foam formation expansion, said compositions being mixtures of
   (a) prepolymers containing free isocyanate groups in the range of about 5 to 25% by weight, based on the prepolymer, which are produced by reacting polyols selected from the group consisting of polyesters, polyethers and mixtures thereof with polyisocyanates;
   (b) the usual adjuvants for polyurethane foams;
   (c) expanding agents; and
   (d) 0.02 to 0.05 percent by weight, based on the weight of the polyols plus adjuvants of a surface active polysiloxane compound which has antifoam activity selected from the group consisting of dimethylsiloxane and prefluorinated alkyl siloxane.

2. Polyurethane foam forming compositions as set forth in claim 1 wherein the polysiloxane compound has a dynamic viscosity in the range of 20 to 300,000 mm².s⁻¹ (at 25°).

3. Polyurethane foam forming compositions as set forth in claim 2 wherein the polysiloxane compound has a dynamic viscosity in the range of 100 to 100,000 mm².s⁻¹(25° C.).

4. Polyurethane foam forming compositions as set forth in claim 1 wherein there is also present siloxane oxyalkylene copolymers which comprise about 5 to 25% siloxane groups and 95 to 75% oxyalkylene groups said copolymers having foam stabilizing activity and said copolymers being present in amounts by weight several times that of the polysiloxane compounds.

5. A polyurethane foam forming composition as set forth in claim 4 wherein the siloxane oxyalkylene copolymers which have foam stabilizing activity are present in an amount of from 1 to 5 percent based on the weight of the polyols plus adjuvants.

6. A method for the production of polyurethane foams having improved stability with respect to post foam formation expansion which comprises supplying to a valved pressure vessel a mixture comprising a prepolymer containing free isocyanate groups in the range of about 5 to 25% by weight, based on the weight of the prepolymer, said prepolymer formed by reacting polyols selected from the group consisting of polyesters, polyethers and mixtures thereof with polyisocyanates; the usual adjuvants for polyurethane foams; expanding agents; and 0.02 to 0.05 percent by weight based on the weight of the polyols plus adjuvants of a polysiloxane compound which has antifoam activity selected from the group consisting of dimethyl siloxane and perfluorinated alkyl siloxane, allowing the mixture to reach pressure equilibrium, maintaining said pressure during storage and releasing said contents outside said vessel to produce a foam which has good form stability with respect to post foam formation expansion.

7. A method as set forth in claim 6 wherein the mixture supplied to the valved pressure vessel contains 0.02 to 0.05 percent by weight of the polysiloxane said polysiloxane having a dynamic viscosity in the range of 20 to 300,000 $mm^2.s^{-1}$ (at 25° C.).

8. A method as set forth in claim 7 wherein there is also contained from 1 to 5 percent based on the weight of the polyols plus adjuvants of siloxane/oxyalkylene copolymers which comprise about 5 to 25% siloxane groups and 95 to 75% hydroxyalkylene groupss.

9. A method as set forth in claim 6 or 7 or 8 wherein the valved pressure vessel is an aerosol container.

10. A polyurethane foam produced by the method of claim 6.

11. Polyurethane foam forming compositions as set forth in claim 1 wherein at least some of said polyols contain tertiary amino groups.

12. Polyurethane foam forming compositions as set forth in claim 1 wherein said polyols have a molecular weight of between 500 and 10,000 and are a mixture of oxypropylated amines and polypropylene glycols.

13. A method as set forth in claim 6 wherein at least some of said polyols contain tertiary amino groups.

14. A method as set forth in claim 6 wherein said polyols have a molecular weight of between 500 and 10,000 and are a mixture of oxypropylated amines and polypropylene glycols.

* * * * *